Nov. 8, 1927.  1,648,550
A. KANTOR
GEAR, SECTIONAL REPLACEMENT
Filed Jan. 19, 1927
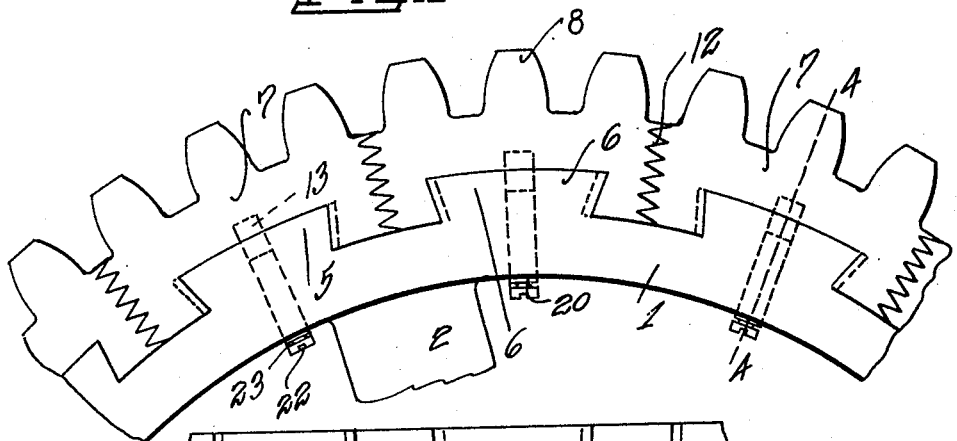
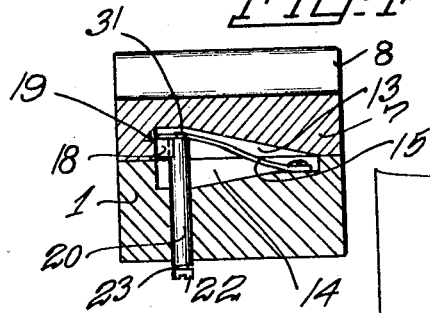
Inventor
Adam Kantor
By Herbert E. Smith
Attorney Patented Nov. 8, 1927.

1,648,550

UNITED STATES PATENT OFFICE.

ADAM KANTOR, OF SPOKANE, WASHINGTON.

GEAR, SECTIONAL REPLACEMENT.

Application filed January 19, 1927. Serial No. 162,064.

My present invention relates to improvements in gear wheels of the type employing sectional teeth or perimeters and the novel features of my invention are applicable for use in various kinds of gear wheels, sprocket wheels &c. For convenience of description and illustration I shall hereinafter refer to the invention as embodied in a gear wheel, in which the teeth may be reversed, if desired, to compensate for wear and in which the worn teeth may be removed when necessary and replaced with fresh and new teeth.

By the utilization of the principles of my invention in the manufacture of gear wheels the cost of production is reduced, the cost of maintenance is retained at a minimum, durability is secured, and facility in repairing and replacing parts is accomplished.

The invention consists in certain novel combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation of a portion of a gear wheel embodying my invention.

Figure 2 is a plan view of the periphery of the wheel-rim used in carrying out my invention.

Figure 3 is a perspective view of one of the arcuate rim segments detached from the wheel.

Figure 4 is a transverse sectional view at line 4—4 of Figure 1.

Figure 5 is an enlarged detail view showing one of the spring locking devices for the rim segments.

In carrying out my invention I utilize a metal wheel of which a portion of the rim 1 and of a spoke 2 are shown in Figure 1. The periphery of the rim 1 is fashioned with two series of dove tailed grooves or mortises 3 and 4 that form two series of complementary tenons 5 and 6. In Figure 2 it will be seen that the grooves of series 3 are cut at a slight angle to the axial line of the wheel and the grooves 4 are cut at a slight angle at the opposite side of the axial center of the wheel and in this manner the dovetail tenons 5 and 6 are fashioned as tapered, a large end alternating with an adjoining small end of a tenon at each side of the wheel.

The toothed periphery of the wheel is made up of reversible and replaceable arcuate rim segments 7, each of which has a number of teeth, as three, indicated by the number 8 to form the teeth of the gear wheel. Each segment at its inner side is fashioned with a pair of side flanges as 9 and 10 which, between them form a dovetail groove 11 complementary to the series of tenons 5 and 6 of the wheel rim. The front and rear ends of each of the segments are provided with corrugated faces 12, and it will be apparent from Figure 1 that these corrugated faces are designed to co-act in retaining the segments against radial displacement. The adjoining flanges as 9, 9, of adjoining segments are adapted to slide into the grooves in the periphery of the wheel rim, and, due to the wedge shape of the flanges that form a tenon and the tapered shape of the complementary mortise or groove, it will be apparent that the pairs of segments may be rigidly and securely locked in the grooved periphery of the wheel rim, due to the frictional engagement of parts, without danger of displacement.

For positively locking the segments in conjunction with the frictional lock I provide each arcuate segment with a tapering pocket 13 in the face of the groove 11 of the segment. A complementary pocket 14 is fashioned in the face of the tenons of the wheel rim and when the segments are in place these two pockets register as indicated in Figure 4 to accommodate the lock-spring 15.

The spring is a flat leaf having a slot 16 at one end and by means of this slot and a screw 17 the spring may be adjusted and secured in the wheel rim, with its free end projecting normally into the pocket 13 of a complementary segment.

At its end, (the free end) the spring carries a lug 18 that engages against the shoulder 19 of the pocket 13 of a segment to lock the segment against displacement.

For releasing the segments and withdrawing the lock springs from the pockets 13, when desired or necessary for repairs or replacements, I provide a release pin 20. Each tenon in the wheel rim is provided with one of these radially extending pins that is reciprocable in a pin-hole in the rim, and the inner end of the pin, as shown projects, normally into the pocket 13 of the segment, and frictionally engages the curved face of the lug 18 of the spring, as indicated in Figures 4 and 5.

This pin is connected at the free end of the spring by a rotary joint or head 21, and in Figure 5 it will be seen that the head is eccentrically arranged so that when the exterior screw head 22 of the pin is used to turn the pin, the latter may be caused to co-act with the lug 18 either to clamp the latter against the shoulder 19 for locking the spring and segment, or for releasing this cam-clamp. When the clamp is released, the pin, which has an annular groove 23 for the reception of a screw driver or other tool, may be withdrawn. Thus by placing the working edge of the screw driver in the groove, the pin may be pried out of the pocket 13 carrying with it its spring and the lug on the end of the spring. Then the segment or segments may be backed out of the grooved wheel rim by blows from a hammer or other tool. These removed segments may be reversed and replaced if desired, or new segments may be substituted for the removed segments.

Having thus fully described my invention, what I claim as new and desire to secure by Letters Patent is:—

1. The combination with a wheel rim having a pocket and a removable arcuate segment having a complementary pocket, of a locking spring carried by the rim and normally projected into said segment socket, and a release pin connected with said spring and accessible from the inner side of the rim.

2. The combination with a wheel rim having a pocket, a spring having one end anchored in the pocket, a retaining lug on the free end of the spring, and a withdrawal pin on said spring, of an arcuate rim segment having a complementary pocket, and a shoulder formed by said pocket for co-action with said lug.

3. The combination with a wheel rim having a pocket, a spring having one end anchored in the pocket, a retaining lug on the free end of the spring, and a withdrawal pin having an eccentric pivot in said spring for co-action with the lug, of an arcuate rim segment having a complementary pocket, and a shoulder formed by said pocket for co-action with the lug.

4. The combination with a wheel rim having alternating dovetail grooves and tenons with the walls of the grooves tapered in opposition directions, of arcuate rim segments each having side flanges, the side flanges on adjoining segments forming tenons interlocking with the grooves of the rim and forming grooves for the rim-tenons, and removable retaining means on the rim for engagement with the segments.

In testimony whereof I affix my signature.

ADAM KANTOR.